United States Patent
Kumar et al.

(10) Patent No.: US 8,385,906 B2
(45) Date of Patent: Feb. 26, 2013

(54) METHOD AND APPARATUS FOR IDENTIFYING NETWORK AFFILIATIONS OF CHURNED SUBSCRIBERS

(75) Inventors: N Hari Kumar, Chennai (IN); Prasad Garigipati, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 200 days.

(21) Appl. No.: 13/041,959

(22) Filed: Mar. 7, 2011

(65) Prior Publication Data

US 2012/0231781 A1 Sep. 13, 2012

(51) Int. Cl.
*H04W 4/00* (2009.01)

(52) U.S. Cl. ............ 455/422.1; 455/408; 455/409; 455/410; 455/405; 379/111; 379/112.01; 379/265; 379/201.01; 379/114.01

(58) Field of Classification Search .......... 455/422.1, 455/408, 409, 410; 379/111, 112.01
See application file for complete search history.

(56) References Cited

U.S. PATENT DOCUMENTS

| | | | |
|---|---|---|---|
| 8,249,231 B2 * | 8/2012 | Chakraborty et al. | ... 379/112.01 |
| 2007/0156673 A1 | 7/2007 | Maga et al. | |
| 2009/0190729 A1 | 7/2009 | Chakraborty et al. | |
| 2009/0192809 A1 * | 7/2009 | Chakraborty et al. | ............ 705/1 |

OTHER PUBLICATIONS

Yan, L., et al., "Predicting Customer Behavior via Calling Links", IEEE Proceedings of International Joint Conference on Neural Networks vol. 4, Jul. 31-Aug. 4, 2005, pp. 2555-2560, Montreal, CA.

* cited by examiner

*Primary Examiner* — Kiet Doan
*Assistant Examiner* — Michael T Vu
(74) *Attorney, Agent, or Firm* — Coats & Bennett, P.L.L.C.

(57) ABSTRACT

In one aspect, the teachings herein provide a method and apparatus for identifying the new network affiliation of a churned subscriber that has moved from an old network operator to a new network operator. Knowing the new network affiliation of a former subscriber provides a number of significant advantages to the old network operator. By way of non-limiting example, the old network operator can undertake new or adjusted advertising targeted at retaining remaining subscribers of like demographics. Additionally or alternatively, the old network operator can review pricing and service plans from the new network operator that are comparable to that used by the former subscriber, and make competitive pricing or service adjustments.

22 Claims, 6 Drawing Sheets

METHOD AND APPARATUS FOR IDENTIFYING NETWORK AFFILIATIONS OF CHURNED SUBSCRIBERS

TECHNICAL FIELD

The present invention generally relates to communication networks having associated subscribers, and particularly relates to a method and apparatus for identifying network affiliations of churned subscribers.

BACKGROUND

Network operators constantly compete for new subscribers, frequently by poaching subscribers from competing network operators. Subscribers become "churners" when they discontinue their subscription (service plan) with one operator and move to a new operator. Network operators work hard to minimize churn, given the costs associated with obtaining new subscribers versus retaining existing subscribers.

Minimizing churn requires an understanding of who churned and why. Thus, churn analysis might be supposed as having three main components: (1) predicting whether a particular subscriber will churn and when; (2) detecting that a particular subscriber has churned; and (3) preventing additional churn by identifying why a particular subscriber churned. Network operators use certain aspects of subscriber churn prediction and detection, but churn prevention based on churner identification is a nascent technology.

SUMMARY

In one aspect, the teachings herein provide a method and apparatus for identifying the new network affiliation of a churned subscriber that has moved from an old network operator to a new network operator. Knowing the new network affiliation of a former subscriber provides a number of significant advantages to the old network operator. By way of non-limiting example, the old network operator can undertake new or adjusted advertising targeted at retaining remaining subscribers of like demographics. Additionally or alternatively, the old network operator can review pricing and service plans from the new network operator that are comparable to that used by the former subscriber, and make competitive pricing or service adjustments.

In one embodiment, a method of identifying new network affiliations of former subscribers that have left a first network operator includes determining in-network calling behavior for a former subscriber of the first network operator, based on evaluating first call data records (CDRs) accumulated for a first data collection window occurring at least partly before the former subscriber left the first network operator. The method further includes determining out-of-network calling behavior for one or more remaining subscribers that are identified from the in-network calling behavior of the former subscriber, based on evaluating second CDRs accumulated for a second data collection window occurring at least partly after the former subscriber left the first network operator.

Using these behavioral determinations, the method continues with correlating the in-network calling behavior with the out-of-network calling behavior, to identify an external network subscriber that is involved in out-of-network calls with said one or more remaining subscribers that characteristically match prior in-network calls between said one or more remaining subscribers and the former subscriber. Further, the method includes identifying the new network affiliation of the former subscriber according to the external network number associated with the identified external network subscriber.

Another embodiment includes a processing apparatus that is configured to identify new network affiliations of former subscribers that have left a first network operator. The processing apparatus includes a pattern recognition processor, a correlation processor, and an identification processor. As a non-limiting example, one or more of these processors may be functionally implemented in a computer, such as a server, based on the execution of stored computer program instructions.

The pattern recognition processor is configured to determine in-network calling behavior for a former subscriber of the first network operator, based on evaluating first call data records (CDRs) accumulated for a first data collection window occurring at least partly before the former subscriber left the first network operator. Further, the pattern recognition processor determines out-of-network calling behavior for one or more remaining subscribers that are identified from the in-network calling behavior of the former subscriber, based on evaluating second CDRs accumulated for a second data collection window occurring at least partly after the former subscriber left the first network operator.

The correlation processor is configured to correlate the in-network calling behavior with the out-of-network calling behavior, to identify an external network subscriber that is involved in out-of-network calls with said one or more remaining subscribers that characteristically match prior in-network calls between said one or more remaining subscribers and the former subscriber. Based on this identification, the identification processor is configured to identify the new network affiliation of the former subscriber according to the external network number associated with the identified external network subscriber. For example, the external network subscriber is "identified" in terms of the associated external network number, and the affiliated network operator is identified from the prefix portion of that number.

Of course, it will be appreciated that the present invention is not limited to the above features and advantages. Indeed, those skilled in the art will recognize additional features and advantages upon reading the following detailed description, and upon viewing the accompanying drawings.

DETAILED DESCRIPTION

Figure 1:
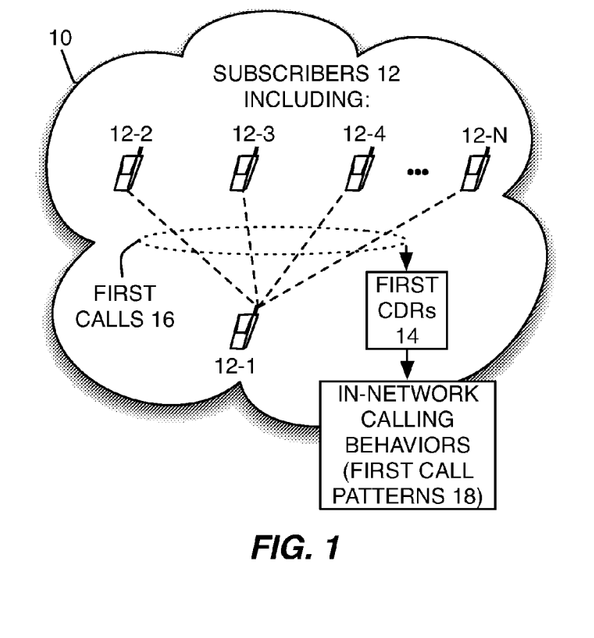
FIG. 1 is a block diagram of one embodiment of a communication network, shown in simplified form and referenced to a time when a given subscriber belongs to the network.

FIG. 1 illustrates a first network 10 having a plurality of subscribers 12, including subscribers 12-1, 12-2, . . . , 12-N. No particular number of subscribers 12 is implied; rather, the figure simply illustrates that there is a plurality of subscribers 12 that "belong" to the first network 10 for a given time frame, with example ones of those subscribers 12 specifically enumerated.

According to one or more embodiments, the network 10 is a wireless communications network, such as a cellular network, and it is owned or otherwise controlled by a first network operator. Non-limiting examples of network operators include AT&T, VERIZON, ORANGE, VODAFONE, and CHINA MOBILE. In this context, the depiction of subscribers 12 will be understood to be synonymous with the depiction of subscriber devices (user equipment, also referred to as UEs), such as mobile telephones, wireless modems, or essentially any other type of wireless communication device that is affiliated with the first network 10 through a subscription agreement.

The first network 10 is configured to collect or otherwise accumulate first call data records (CDRs) 14 over one or more first data collection windows. As an example, these first CDRs 14 include called/calling number information, call times, call duration, and, possibly, location information for the called and/or called party. "Call" as used herein means traditional voice calls in at least one embodiment. However, other embodiments are contemplated where the term "call" additionally or alternatively means "data" calls, such as may be used in multimedia connections or other data sessions.

Assume that during these one or more first data collection windows that various ones of the subscribers 12 make calls 16 to each other, where such calls 16 are suggested by the dashed lines interconnecting certain subscribers 12. More particularly, assume that there are regularly occurring calls 16 between the subscriber 12-1 and the subscribers 12-2, 12-3, . . . , 12-N. Thus, while the CDRs 14 may be comprehensive and include call details for all calls to/from the entire population of subscribers, they will at least include call details for calls to/from at least one subset of the subscribers 12.

Assume that, at some point, the subscriber 12-1 "departs" from the first network operator—i.e., the subscriber 12-1 terminates its subscription agreement and thus becomes a former subscriber 12-1. See FIG. 2, which depicts the former subscriber 12-1 operating in an unknown external network 20 as external network subscriber 22-1, among a plurality of subscribers 22 affiliated with the external network 20.

Figure 2:
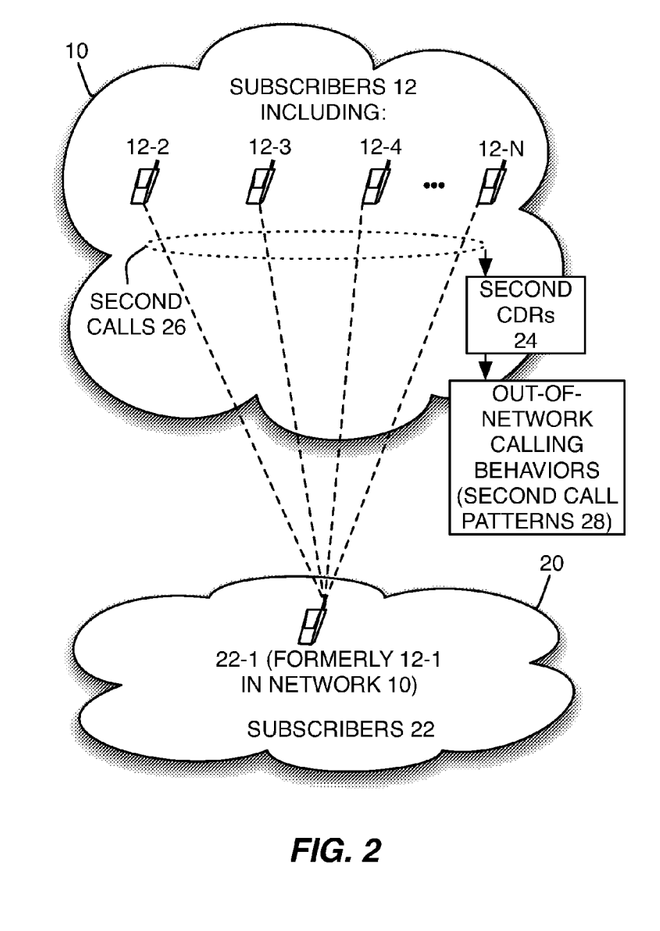
FIG. 2 is a block diagram showing the communication network of FIG. 1 as a first network in juxtaposition with a second, external communication network, where the illustration is referenced to a time when the given subscriber has churned from the first network and joined the second network.

Assume that the network 10 continues accumulating CDRs, including second CDRs 24, where at least some portion of the second CDRs 24 correspond to a time after the subscriber 12-1 departs—i.e., terminates its network subscription—and thereby becomes former subscriber 12-1. Thus, one has first CDRs 14 accumulated at least partly in advance of the subscriber 12-1 departing and second CDRs 24 accumulated at least partly subsequent to the subscriber 12-1 departing. These may be regarded as "pre-departure" CDRs 14 and "post-departure" CDRs 24.

Now, imagine that before departure, subscriber 12-1 made calls to subscriber 12-2 having characteristic call times and/or call durations. As an example, assume that subscriber 12-1 called subscriber 12-2 on most weekdays at 9:00 AM. Expanding the example, assume that subscriber 12-1 regularly received calls from subscriber 12-3, primarily on late Sunday afternoons, and that these calls rarely lasted less than sixty minutes. All such activity is captured in the first CDRs 14. In a particular example, the first CDRs 14 include called/calling numbers, call dates, and call start/end times. All such calling activity is suggested by the dash lines interconnecting subscriber 12-1 with subscribers 12-2, 12-3, and so on, as shown in FIG. 1

Then, as noted, the subscriber 12-1 becomes a former subscriber but subscribers 12-2 and 12-3 continue their affiliation with the first network operator—i.e., they remain subscribers of the first network operator. Thus, as the network 10 accumulates the second CDRs 24 over one or more later, second data collection windows that cover at least some time after the departure of the subscriber 12-1, these second CDRs 24 will continue capturing call details for the subscribers 12 that remain with the first network operator, including the remaining subscribers 12-2 and 12-3.

It is advantageously recognized herein that the former subscriber 12-1 most likely has affiliated with another network operator and it is also likely that the remaining subscribers 12-2 and 12-3 and the former subscriber 12-1 will continue engaging in calls 26 that are consistent with their historic call patterns. Thus, FIG. 2 uses dashed lines to depict calling activity between the remaining subscribers 12-2, 12-3, and so on, and the former subscriber 12-1 now operating as external network subscriber 22-1. The second CDRs 24 capture such calling activity.

Thus, the CDRs 14 include call detail records exhibiting characteristic call patterns 18 between subscriber 12-1, and other subscribers 12-2, 12-3, etc., for a pre-departure time period, and CDRs 24 include call detail records exhibiting characteristic call patterns 28 between the former subscriber 12-1 (now operating as external network subscriber 22-1) and the subscribers 12-2, 12-3, etc., who have remained with the first network operator. According to advantageous processing disclosed herein, the first call patterns 18 are derived or otherwise obtained from the CDRs 14 and correlated with the second call patterns 28 similarly obtained from the CDRs 24.

From such correlation, one may identify calls between remaining subscribers 12 and an external network subscriber 22-1 that exhibit substantially the same patterns as calls between those same remaining subscribers 12 and a former subscriber 12-1. In that regard, the identified external subscriber 22 may be deemed to be the former subscriber 12-1, with a high degree of confidence.

Before turning to details for carrying out such identification, one point worth making is that FIGS. 1 and 2 present a simplified case where all of the subscribers 12 operate within the depicted confines of the first network 10 and all external network subscribers 22 operate within the confines of the external network(s) 20. This depiction is not meant to suggest that the CDRs 14 and/or CDRs 24 do not include call detail records for calls involving "roaming" subscribers, wherein a given subscriber makes calls through a visited network rather than the subscriber's home network.

What is key, however, is that the CDRs 14 capture data for "in-network" calls 16 between the former subscriber 12-1 and one or more other subscribers 12 of the first network operator. Here, an "in-network" call does not necessarily mean that one or both involved subscribers 12 are not roaming, but rather means simply that one subscriber 12 of the first network operator calls another subscriber 12 of the first network operator. In contrast, the CDRs 24 capture data for "out-of-network" calls 26, where subscribers 12 of the first network operator make or receive calls to or from an external network subscriber 22. In fact, the first CDRs 14 and second CDRs 24 may be comprehensive and each one may capture all calling activity, both in- and out-of-network.

But it will be understood that calls 16 occur between subscriber 12-1 and various other subscribers 12 before the departure of subscriber 12-1, meaning that CDRs 14 collected before the subscriber 12-1 departs the network 10 will exhibit call patterns characteristic for the in-network communications behavior between subscriber 12-1 and 12-2, and so on. Then, with CDRs 24 collected at least partly after departure of the subscriber 12-1, those CDRs will not include call records explicitly for the former subscriber 12-1, but will include call records for the remaining subscribers 12-2, 12-3, and so on.

Thus, to the extent that those remaining subscribers 12 continue their characteristic communications behavior with respect to the former subscriber 12-1, calls to/from the former subscriber 12-1, now operating as the external network subscriber 22-1, will be captured in the CDRs 24 and those calls will exhibit the same characteristic call times, durations, etc., as exhibited by the earlier calls between the subscriber 12-1 and subscribers 12-2, 12-3, etc., before the departure of subscriber 12-1.

Figure 3:
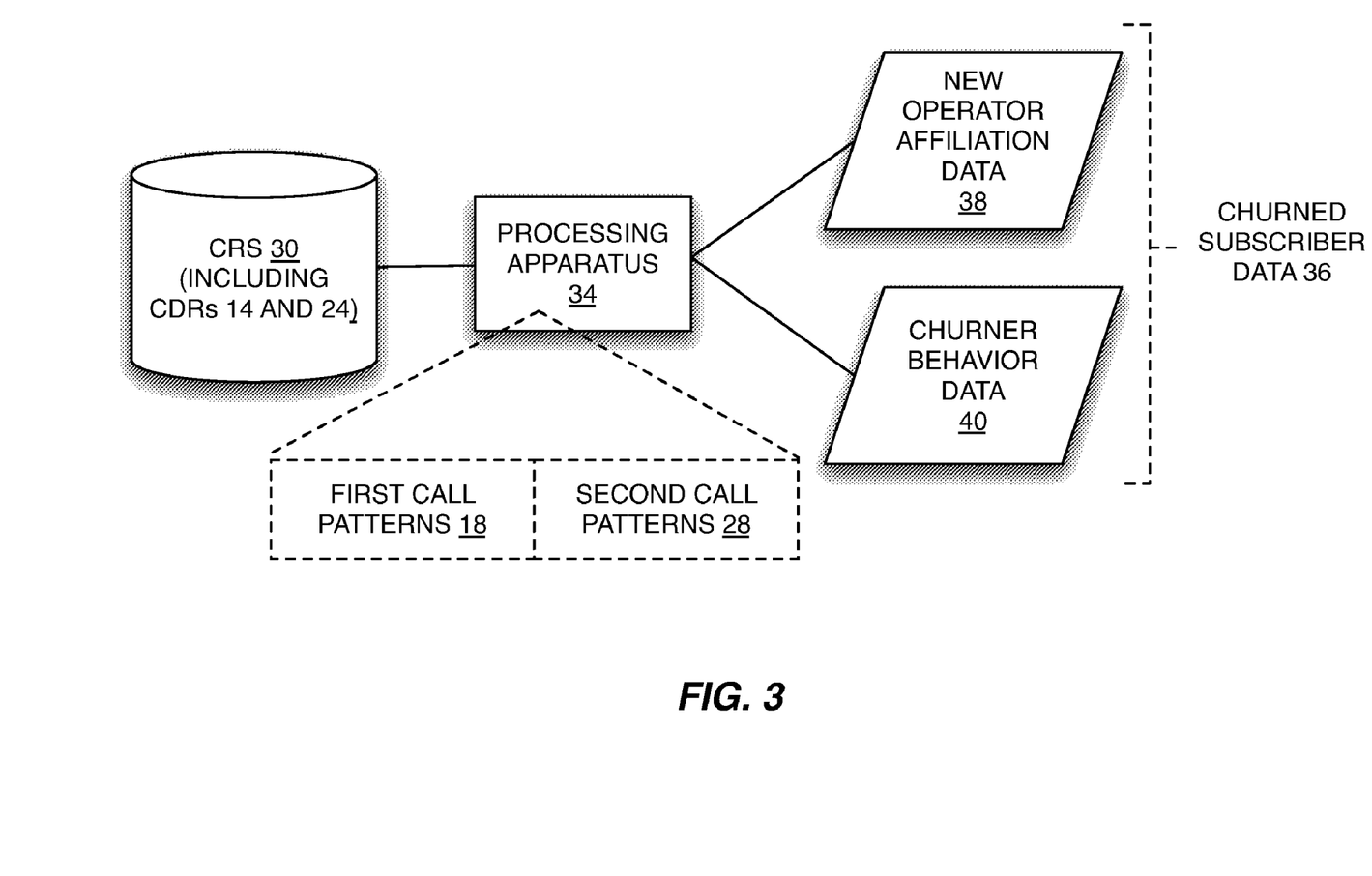
FIG. 3 is a block diagram of one embodiment of an apparatus for collecting call data records for a network and one embodiment of a processing apparatus for evaluating such records to determine new network affiliations of a churned subscriber.

FIG. 3, in particular, provides one example of a processing apparatus configured to identify new network affiliations of former subscribers that have left a first network operator. In this regard, FIG. 3 depicts a "Charging Reporting System" (CRS) 30 that accumulates or otherwise stores CDRs for any number of data accumulation windows. Thus, the CRS 30 holds CDRs denoted as CDRs 14 collected before the departure of subscriber 12-1 (and/or any number of other subscribers 12) and CDRs 24 collected after that departure. The CRS 30 may also be referred to as a "CDR server," signifying its role as a source for the CDRs 14 and 24.

FIG. 3 also depicts a processing apparatus 34 that is configured to generate churned subscriber data 36 from the CDRs 14 and 24. To do so, in at least one embodiment, the processing apparatus 34 is configured to evaluate or otherwise process the CDRs 14 and 18 to generate the first call patterns 18 and second call patterns 28, respectively. In a non-limiting example, the processing apparatus 34 generates the call patterns 18 and 28 for at least some of the subscribers 12 represented in the CDRs 14 and 18 by determining statistical call data.

Continuing this example, each subscriber 12 can be identified by its network number, the most frequently called/calling numbers are identified for the subscriber 12, along with identifying call times and durations for those calls. One or more additional parameters, such as called/calling number location data also may be collected and characterized. All such data may be stored in a data structure that is indexed on a per subscriber basis. Of course, this is a non-limiting example.

In any case, the processing apparatus 34 evaluates the first and second call patterns 18 and 28, to generate the churned subscriber data 36. The churned subscriber data 36 comprises new operator affiliation data 38 and/or churner behavior data 40. The former data comprises, for example, identification of one or more external network operators with which one or more former subscribers appear to have affiliated. The latter data comprises, for example, information reflecting statistical trends, such as identification of which competing network operators appear to have gained the most former subscribers of network 10 over a given time period.

For example purposes, one may assume that the CRS 30 and processing apparatus 34 are associated with the first network 10 and operate under control of the first network operator. Of course, any number of network operators may have their own CRSs 30 and processing apparatuses 34, to produce their own sets of churned subscriber data 36. In any case, with its association with the first network operator, it will be assumed that the processing apparatus 34 has access—e.g., secure access—to the first CDRs 14 and second CDRs 24 for subscribers 12 in the first network 10, for any number of record accumulation periods.

As a non-limiting example, the CDRs 14 and 24 span multiple monthly billing periods, including one or more periods where a certain subscriber 12-$x$ was part of the subscriber base for the first network 10, and one or more months subsequent to the subscriber 12-$x$ terminating its subscription with the first network 10 and, presumably, newly affiliating with an unknown, competing network. Here, the "$x$" suffix denotes some particular subscriber 12, from among the overall plurality of subscribers 12 of the first network 10, and 22-$x$ may be used to denote that same former subscriber operating as an external network subscriber.

Figure 4:
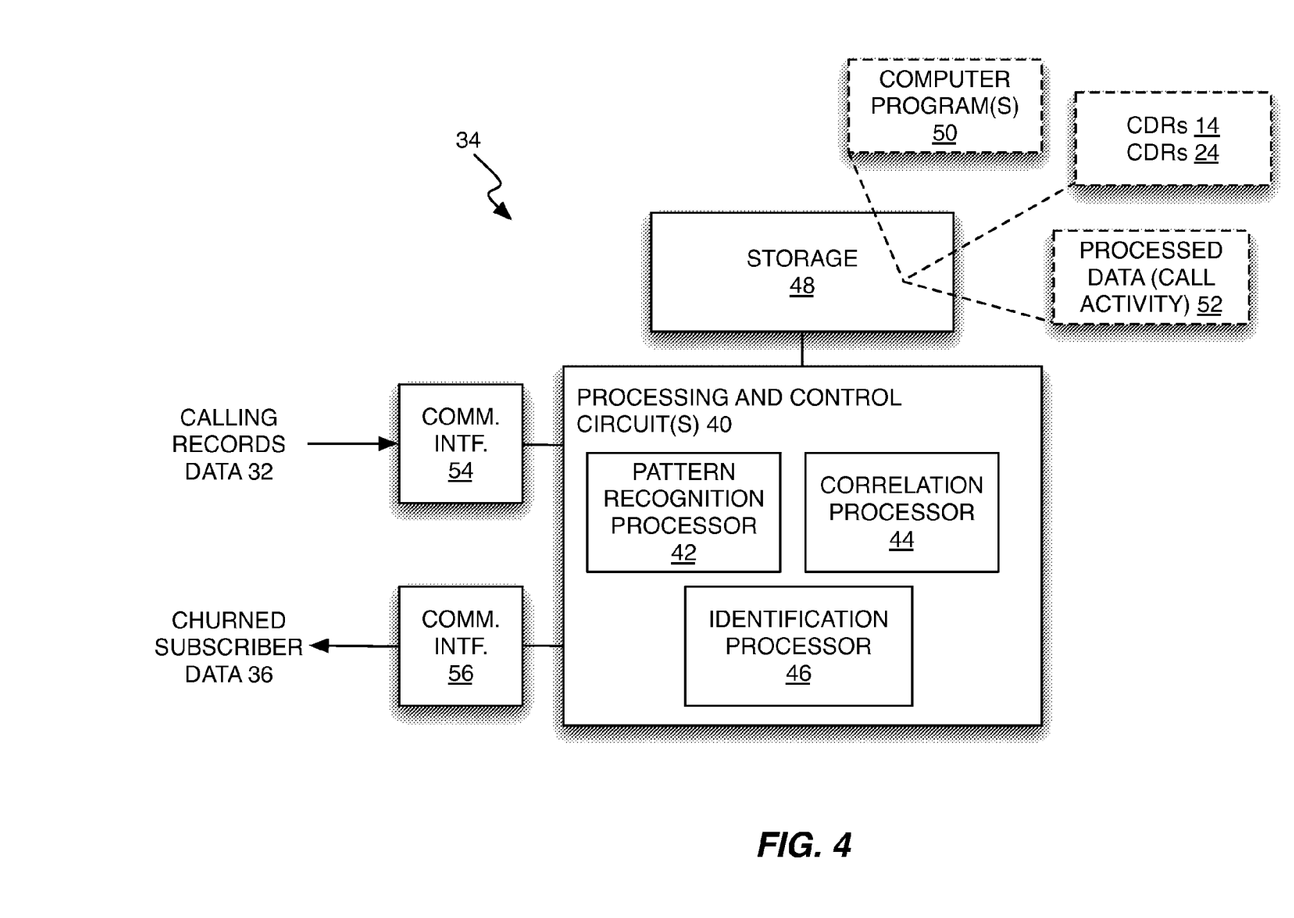
FIG. 4 is a block diagram on example details for the processing apparatus introduced in FIG. 3.

With reference to the illustration provided by FIG. 4, one sees an example of the processing apparatus 34 contemplated in one or more embodiments contemplated herein. The illustrated processing apparatus 34 comprises processing and control circuits 40, which may comprise one or more microprocessor-based circuits. In one example, the processing apparatus 34 comprises a configured computer, such as a PC-based server running one or more stored computer programs.

At least functionally, the processing and control circuits 40 comprise a pattern recognition processor 42, a correlation processor 44, and an identification processor 46. The processing and control circuits 40 further include or are associated with storage 48, which provides storage for one or more computer programs 50, the CDRs 14 and 24, and processed data 52. Note that the processed data 52 comprises the first and second call patterns 18 and 28, and data derived from them, such as correlation results, etc.

Still further, the example processing apparatus 34 includes at least one communication interface, such as communication interfaces 54 and 56. Here, the processing apparatus 34 receives the CDRs 14 and 24 from the CRS 30 via the communication interface 54. Further, in the example illustration, the processing apparatus 34 outputs the churned subscriber data 36 via the communication interface 56, such as for further use by an advertising system which uses the data to adapt or generate advertising and/or subscriber incentive programs as a function of the churned subscriber data 36.

In at least one embodiment, the illustrated processing apparatus 34 is configured to identify new network affiliations of former subscribers that have left a first network operator. Correspondingly, the pattern recognition processor 42 is configured to determine in-network calling behavior for a former subscriber, e.g., 12-1, of the first network operator, based on evaluating first call data records (CDRs) 14 accumulated for a first data collection window occurring at least partly before the former subscriber 12-1 left the first network operator. The pattern recognition processor 42 also determines out-of-network calling behavior for one or more remaining subscribers 12 that are identified from the in-network calling behavior of the former subscriber 12-1, based on evaluating second CDRs 24 accumulated for a second data collection window occurring at least partly after the former subscriber 12-1 left the first network operator.

As an example, the first network operator identifies a subset of subscribers in its overall subscriber population that are most likely to terminate their subscriptions by the next billing cycle (or at some near-term future time). The first network operator thus collects the first CDRs 14 for this identified subset and then uses billing/account information to identify any of those subscribers 12 that actually churned (quit). For any given one of the churned subscribers 12, the CDRs 14 can be analyzed to identify the in-network "social connections" of the churned subscriber 12. These social connections are other subscribers 12 within the network 10 who are/were involved in regular calling activity with the churned subscriber 12. Now having identified those social connections, second CDRs 24 can be collected for the churned subscriber's social connections, to see whether any one or more of them are engaging in out-of-network calls that characteristically match prior in-network calls between the churned subscriber and those same social connections.

To better appreciate this capability, consider that the correlation processor 44 is configured to correlate the in-network calling behavior involving a given former subscriber 12-1 and one or more other subscribers 12, with the later, out-of-network calling behavior of those same other subscribers 12. This allows the correlation processor 44 to identify an external network subscriber 22-1 that is involved in out-of-network calls 26 with the same one or more remaining subscribers 12 that characteristically match prior in-network calls 16 between the one or more remaining subscribers 12 and the former subscriber 12-1. In turn, the identification processor 46 is configured to identify the new network affiliation of the former subscriber 12-1 according to the external network number associated with the identified external network subscriber.

In one or more embodiments, the pattern recognition processor 42 is configured to determine the in-network calling behavior of the former subscriber 12-1 by identifying first call patterns 18 in the first CDRs 24, the first call patterns 18 reflecting one or more call characteristics for in-network calls 16 involving the former subscriber 12-1 during the first data collection window. The pattern recognition processor 42 is further configured to determine the out-of-network calling behavior by identifying second call patterns 28 in the second CDRs 24. These second call patterns 28 reflect one or more call characteristics for out-of-network calls 26 involving the one or more remaining subscribers 12 during the second data collection window. Again, the one or more remaining subscribers 12 to look at, in terms of their out-of-network calling behavior, can be one or more subscribers 12 that are known from the first CDRs 14 to have prior, regular in-network calling activity with the former subscriber 12-1.

In at least one embodiment, the correlation processor 44 is configured to correlate the in-network calling behavior with the out-of-network calling behavior by correlating values representing the one or more call characteristics for the in-network calls with respective values representing the one or more call characteristics for the out-of-network calls. That is, with the in-network calls 16 represented in the first call patterns 18 and the out-of-network calls 26 represented in the second call patterns 28 characterized using like parameters—such as call times, durations, etc.—the correlation processor 44 is configured to compare respective parameters of the same type between the first and second call patterns 18 and 28, to identify matching in-network and out-of-network call characteristics.

Thus, in at least one embodiment, the correlation processor 44 is configured to correlate the in-network calling behavior with the out-of-network calling behavior by determining whether there are out-of-network calls 26 between an external network subscriber 22-1 and the one or more remaining subscribers 12 during a second data collection window that characteristically matches in-network calls 16 between the former subscriber 12-1 and the same one or more remaining subscribers 12 during the first data collection window. If so, the correlation processor 44 and/or the identification processor 46 identifies external network subscriber 22-1 as the former subscriber 12-1. Here, "identifies" does not necessarily mean determining personally identifying information regarding the actual identity of the former subscriber 12-1. In one or more embodiments, identifying an external network subscriber 22 as being a former subscriber 12 means recognizing from correlation of the above-discussed in-network and out-of-network calling behaviors that the external subscriber 22 is likely—at some defined statistical confidence level—to be the former subscriber 12.

Indeed, there may be cases where, when trying to identify a given former subscriber 12, relatively good correlations may be observed for more than one external subscriber 22. Thus, in at least one embodiment, for the case where correlation of the in-network and out-of-network calling behaviors identifies more than one external network subscriber 22 as possibly being the former subscriber 12, the correlation processor 44 is further configured to compare the degree of correlation exhibited for each of the more than one external subscribers 22, or to perform further correlations involving additional call characterization parameters, to identify the one external network subscriber 22 that is most likely to be the former subscriber 12.

Further, in at least one embodiment, the identification processor 46 is configured to determine a confidence value based on correlation results determined from correlating the in-network and out-of-network calling behaviors. The confidence value indicates a confidence at which the external network subscriber 22 has been identified as being the former subscriber 12.

Along these same lines, it will be appreciated that the processing apparatus 34 may deem the correlation results to be too low to justify inferring from the call patterns 18 and 28 that a given external network subscriber 22 is a former subscriber 12. For example, the correlation results take on an overall value reflecting the degree to which characteristic call times/durations and locations determined from the first CDRs 18 match the characteristic call times/durations and locations determined from the second CDRs 28. Here, like correlation parameters, such as characteristic call times relating one called number to another calling number, may be correlated for and between subscribers, to develop a numeric correlation result. A correlation of zero represents no match, while a correlation of one represents complete matching. Intermediate values, such as 0.8 or 0.2 represent relatively high and relatively low matches, respectively. Of course, these are examples and other numeric ranges or representations may be used.

It should also be noted, as an example, that the first CDRs 14 are accumulated by or for the processing apparatus 34 based on identifying a subset of current subscribers 12 that are considered likely to leave the first network operator in the near-term. As such, it is likely that one or more of these subscribers 12 actually will leave the network 10 and thereby become former subscribers 12. Thus, for any given one of those subscribers 12 in the subset that actually do later leave the network 10, the first CDRs 14 will have been accumulated while those former subscriber 12 were still with the network 10. Put simply, the first network operator can identify a subset of subscribers 12 that are most likely to churn (terminate their subscriptions) and then collect CDRs for that subset, so that in-network calling behavior can be determined for any subscribers 12 in the subset that later churn.

In this regard, for any given former subscriber 12, the processing apparatus 34 is configured to determine in-network social connections for the former subscriber 12 using these first CDRs 14 and identify the in-network calling behaviors for the former subscriber 12 with respect to those in-network social connections. Here, it will be appreciated that these social connections are the particular ones of the other subscribers 12 of the first network operator that were "linked" or "associated" with the former subscriber 12 via in-network calling activity.

With this basis, the second CDRs 24 are accumulated by or for the processing apparatus 34 based on collecting CDRs at least for the in-network social connections of the former subscriber 12. Accordingly, the processing apparatus 34 is configured to identify the out-of-network calling behaviors for one or more of those in-network social connections.

Also, note that the processing apparatus 34 may be configured to filter the first and second CDRs 14 and 24 in advance of determining the in-network and out-of-network calling behaviors, respectively, such that said first and second CDRs each comprise per call data records including one or more of: calling number, called number, served MSISDN, call duration, call volume, number of events, timestamp and a location data. Of course, filtering may not be done, but certain filtering offers advantages in terms of reducing processing complexity, data set sizes, etc. Indeed, certain filtering, such as that suggested above, may be used to reduce the CDRs to just those parameters useful in gleaning calling behavior.

In one approach to determining such behavior, the processing apparatus 34 is configured to determine the in-network calling behavior by determining most frequently called/calling numbers and characteristic call times and durations for in-network calls 16 involving a former subscriber 12 during a first data collection window during which the former subscriber 12 is still with the network 10. The processing apparatus 34 is further configured to determine the out-of-network calling behavior by determining most frequently called/calling numbers and characteristic call times and durations for out-of-network calls 26 involving one or more remaining subscribers 12 during the second data collection window which falls at least partly after the former subscriber 12 has left the network 10.

Finally, it should also be noted that the first network operator can accumulate CDRs for all or some of its subscribers 12 on an ongoing basis and then select CDRs collected just before and just after the departure of a given subscriber 12. That is, the network operator can collect CDRs routinely and then use detection of actual subscription terminations as a basis for identifying the former subscribers 12 for which the calling behavior processing is to be performed using the available CDRs.

Figure 5:
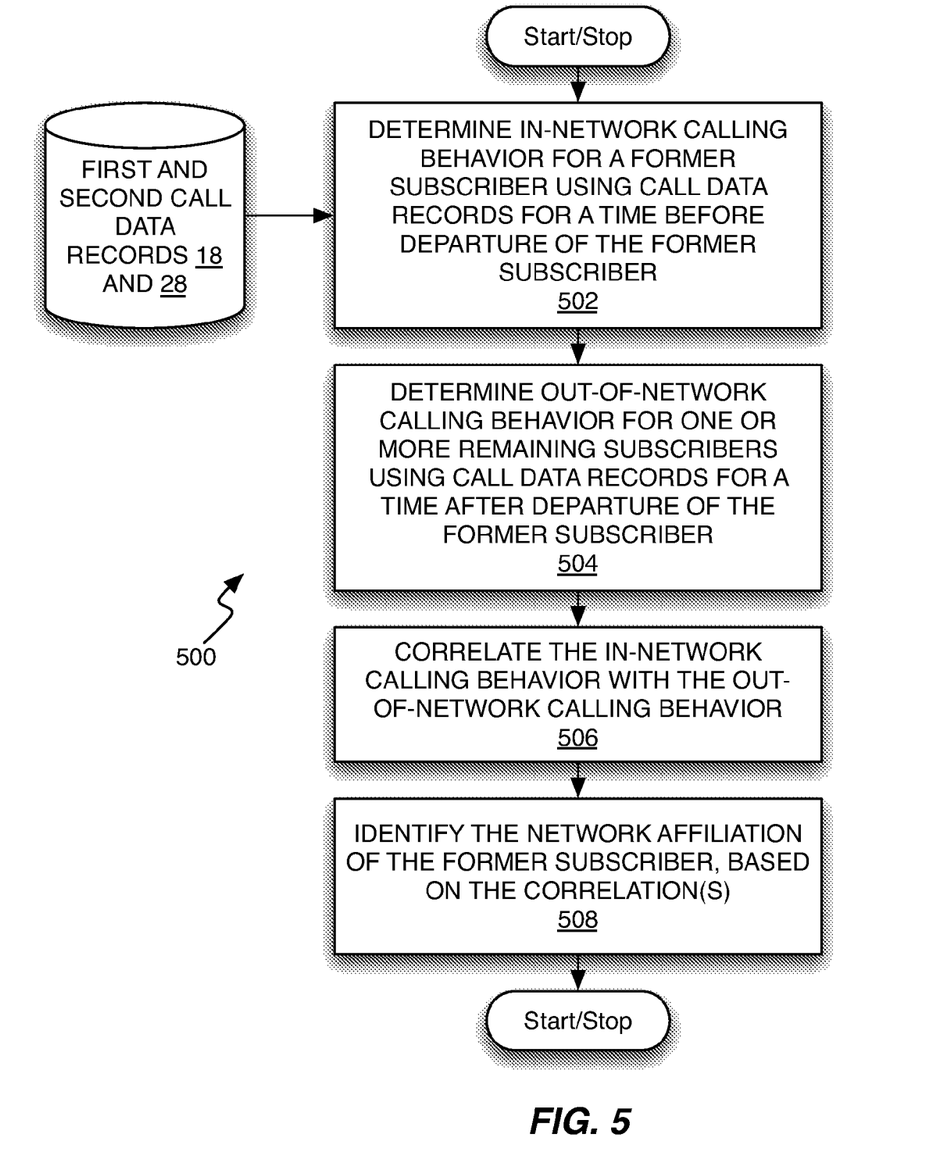
FIG. 5 is a logic flow diagram of one embodiment of a processing method that is implemented by the processing apparatus of FIGS. 3 and 4, for example.

FIG. 5 illustrates a method 500 corresponding to the processing apparatus operations described above. As such, the method 500 may be implemented by programmatic configuration of the processing apparatus 34—e.g., the execution of stored computer program instructions by one or more digital processing circuits within the processing apparatus 34 that correspondingly causes the processing apparatus 34 to carry out the method 500.

Broadly, FIG. 5 presents the method 500 as a method of identifying new network affiliations of former subscribers that have left a first network operator. The method 500 includes determining (Block 502) in-network calling behavior for a former subscriber 12 of the first network operator, based on evaluating first CDRs 14 accumulated for a first data collection window occurring at least partly before the former subscriber 12 left the first network operator. The method 500 further includes determining (Block 504) out-of-network calling behavior for one or more remaining subscribers 12 that are identified from the in-network calling behavior of the former subscriber 12, based on evaluating second CDRs 24 accumulated for a second data collection window occurring at least partly after the former subscriber left the first network operator. Here, the in-network calling behavior is represented by, for example, the first call patterns 18 and the out-of-network calling behavior is represented by, for example, the second call patterns 28.

The method 500 continues with correlating (Block 506) the in-network calling behavior with the out-of-network calling behavior, to identify an external network subscriber 22 that is involved in out-of-network calls with said one or more remaining subscribers 12 that characteristically match prior in-network calls between said one or more remaining subscribers 12 and the former subscriber 12.

Correspondingly, the method 500 includes (Block 508) identifying the new network affiliation of the former subscriber 12 according to the external network number associated with the identified external network subscriber 22. For example, the new network affiliation is identified by identifying the network operator corresponding to the mobile number prefix included in the external network number of the identified external network subscriber 22.

With the above in mind, it will be appreciated that it is broadly contemplated herein to analyze the behavioral characteristics of a subscriber before and after he or she has churned. The teachings herein provide a method and apparatus for identifying the competing network operators that have attracted former subscribers. In at least some embodiments, the teachings herein disclose methods and apparatus for identifying otherwise hidden patterns exhibited by all the churned subscribers of a given network operator. For example, the churned behavior data 40 shown in FIG. 3 can include information from which the network operator can determine that most of the churned subscribers that belonged to service class "X" have churned out to a competitive operator "Y."

Figure 6:
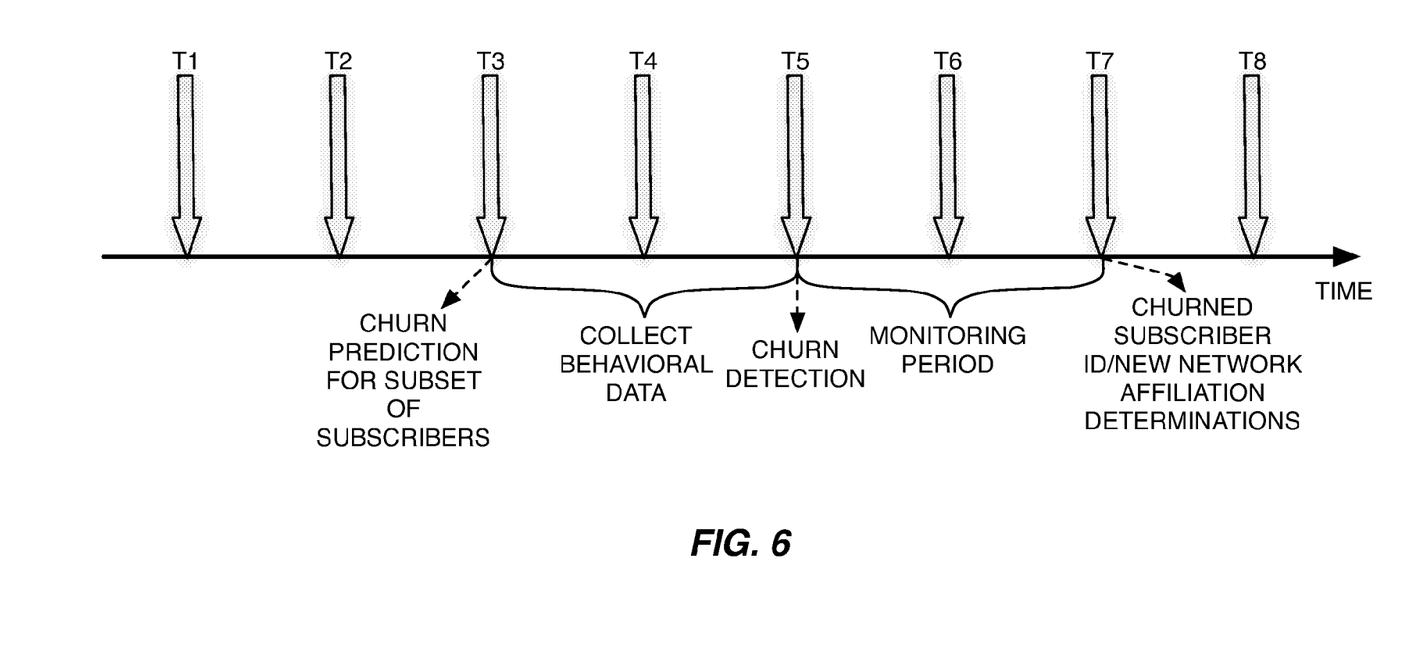
FIG. 6 is a diagram of one embodiment of a processing timeline for predicting subscribers likely to churn, collecting pre-churn call data records, detecting actual churn, collecting post-churn call data records, and using the collected records to identify the new network affiliations of churned subscribers.

Consider FIG. 6, which illustrates an example process timeline of identifying the "landing zone" of a "churner." Here, "landing zone" means the external network operator that a former subscriber, i.e., the churner, chooses to affiliate with.

In a normal churn analysis, churn-out period refers to the interval after which a churn prediction/detection process is triggered. Typically it will be at the end of a monthly billing cycle or at the end of a quarter. In the example, we have churn-out periods referred to as T1, T2, T3, . . . , T8. The processing implicated in the figure includes:

predicting the list of churners;
collecting behavioral data and constructing mobile social networks for the obtained list of churners;
detecting the actual churners—i.e., those predicted churners on the list who actually churn from the given operator's network;
monitoring the operator's network for similarity matches in characteristics between the churned-out subscribers and new external network subscribers;
predicting at certain confidence levels the detection of actual churned subscribers within one or more of the competing external networks; and
identifying patterns buried with the behavior of those detected churned subscribers.

The identified patterns may be used to drive subscriber retention programs, advertising campaigns, pricing, etc.

Of further note, and as suggested earlier herein, there are advantageous approaches to determining the number of subscribers to evaluate. For example, the network operator may use a churn prediction method to predict a particular subset of current subscribers who might churn by the next billing period. CDRs and/or derived call patterns may be collected for just those predicted churners. Assuming that some of the predicted churners in fact remain with the network operator into the next billing cycle, CDRs and/or derived call patterns may be collected for these particular remaining subscribers.

It will be understood that the CDRs represent behavioral data, and that such data may be collected for a number of time periods, e.g., two churn periods. At the end of the collection period(s), a churn detection technique is used to find the subscribers that actually churned out of the operator's network. The "mobile social network" of the actual churners is stored for future monitoring. In at least one embodiment, the "mobile social network" is, at a minimum, a listing of the other subscribers of the operator that were involved in regular communications with the churned subscribers.

For the next couple of churn-out periods, the connected components of the actual churners in the mobile social network are monitored for a new external connection. Here, the "connected components" are one or more of those remaining subscribers that were identified as being within the mobile social network of the churned subscribers. If an external network subscriber exhibits the same social connectivity as one of the actual churners, that external network subscriber is deemed to be one of the churned subscribers. The new network affiliation is identified, for example, by analyzing the mobile number prefix associated with the external subscriber.

One approach to implementing the above technique includes:

- collecting CDRs for the appropriate time periods and subscribers;
- filtering the CDRs to keep only meaningful call data, such as calling number, called number, served MSISDN, duration, volume, number of events, timestamp and the location number;
- calculating social-network measures like in-degree and out-degree measures for all distinct called numbers and calling numbers;
- obtaining, e.g., for a current month, a list of predicted churners (probable churners);
- analyzing the called numbers external to the operator's network for and attempting to find external numbers with the same in-degree value were observed for the actual churners before they churned.

If more than one external number appears to identify a given actual churner, a better identification can be made by narrowing down the candidate external numbers based on comparing multiple call behaviors, such as duration, volume, number of events, location number and time of day (morning, afternoon, evening). Note that time-of-day analysis may be based on "slotting," such as by considering a timeslot between 6:00 AM to 10:00 AM, a timeslot between 10:00 AM-6:00 PM, a timeslot between 6:00 PM to 12:00 AM, and a timeslot between 12:00 AM and 6:00 AM. Of course, other time-of-day quantizations may be used and the above examples are non-limiting.

Figure 7:
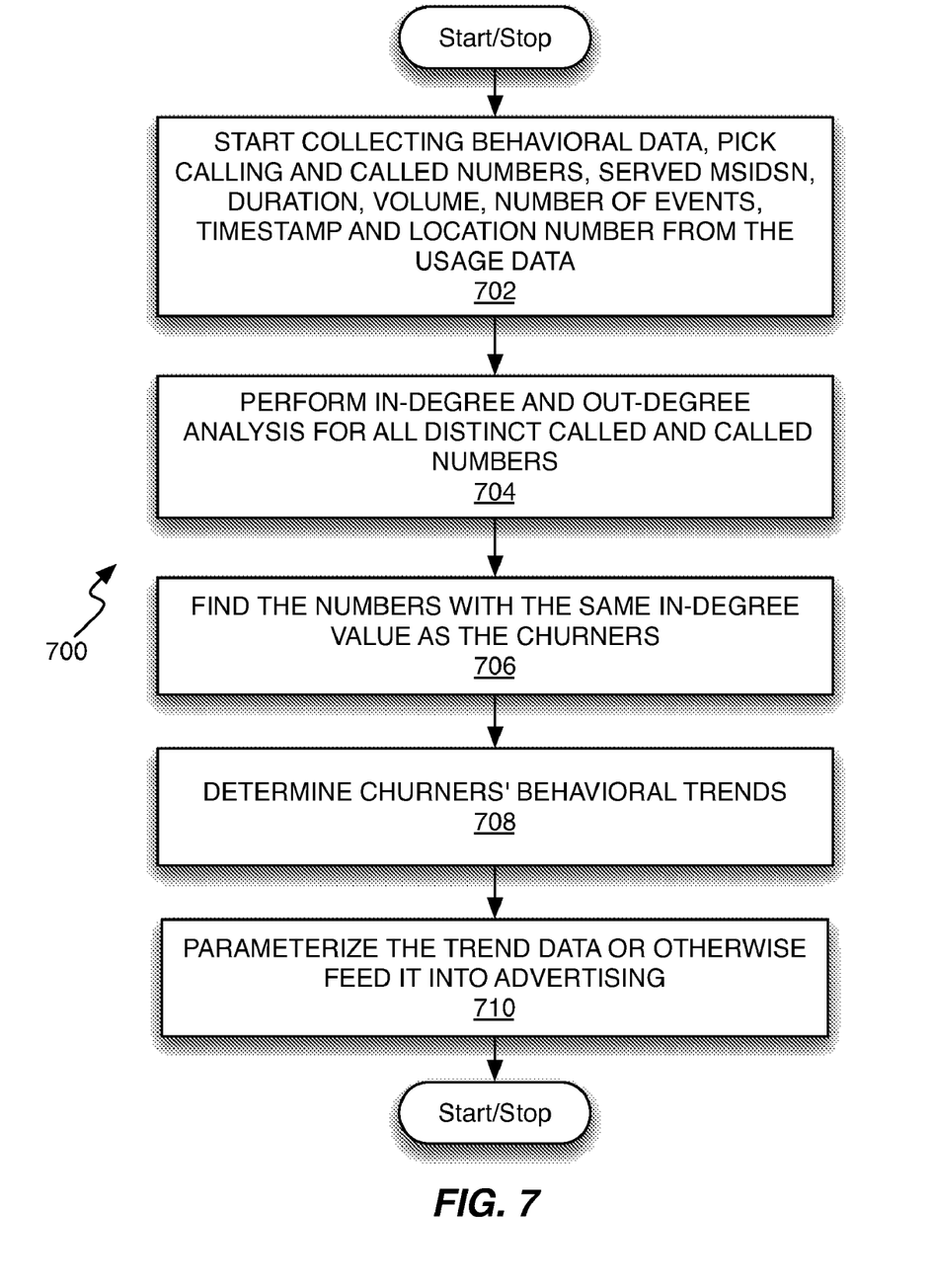
FIG. 7 is a logic flow diagram of one embodiment of a processing method for identifying the new network affiliations of churned subscribers.

FIG. 7 illustrates a method 700 of processing according to the example details given immediately above. The method 700 may be implemented in the processing apparatus 34, or in another computer system operating under control of the first network operator. In any case, the method 700 includes collecting (Block 702) behavioral data, picking called/calling numbers, served MSIDSN, etc. Processing continues with performing (Block 704) in-degree and out-degree analysis for all distinct called and called numbers, and finding (Block 706) the numbers with the same in-degree as the churned subscribers. From these findings, the method 700 continues with determining (Block 708) the churners' behavioral trends, and feeding (Block 710) the trend data or parameterized trend data into the network operator's advertising process (which may comprise making the electronic data available for use in an advertising analysis.

Of course, FIG. 7 represents just one of the several examples provided herein and should not be considered as limiting. More broadly, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of identifying new network affiliations of former subscribers that have left a first network operator, said method comprising:

determining in-network calling behavior for a former subscriber of the first network operator, based on evaluating first call data records (CDRs) accumulated for a first data collection window occurring at least partly before the former subscriber left the first network operator;

determining out-of-network calling behavior for one or more remaining subscribers that are identified from the in-network calling behavior of the former subscriber, based on evaluating second CDRs accumulated for a second data collection window occurring at least partly after the former subscriber left the first network operator;

correlating the in-network calling behavior with the out-of-network calling behavior, to identify an external network subscriber that is involved in out-of-network calls with said one or more remaining subscribers that characteristically match prior in-network calls between said one or more remaining subscribers and the former subscriber; and identifying the new network affiliation of the former subscriber according to the external network number associated with the identified external network subscriber.

2. The method of claim 1, wherein determining the in-network calling behavior comprises identifying first call patterns from the first CDRs, said first call patterns reflecting one or more call characteristics for in-network calls involving the former subscriber during the first data collection window, and further wherein determining the out-of-network calling behavior comprises identifying second call patterns from the second CDRs, said second call patterns reflecting one or more call characteristics for out-of-network calls involving said one or more remaining subscribers during the second data collection window.

3. The method of claim 2, wherein correlating the in-network calling behavior with the out-of-network calling behavior comprises correlating values representing the one or more call characteristics for the in-network calls with respective values representing the one or more call characteristics for the out-of-network calls.

4. The method of claim 1, wherein correlating the in-network calling behavior with the out-of-network calling behavior comprises determining whether there are out-of-network calls between an external network subscriber and the one or more remaining subscribers during second data collection windows that characteristically match in-network calls between the former subscriber and the same one or more remaining subscribers during the first data collection window and, if so, identifying that external network subscriber as the former subscriber.

5. The method of claim 1, further comprising, for the case where said correlating identifies more than one external network subscriber as possibly being the former subscriber, comparing the degree of correlation exhibited for each of the more than one external subscribers, or performing further correlations involving additional call characterization parameters, to identify the one external network subscriber that is most likely to be the former subscriber.

6. The method of claim 1, wherein identifying the new network affiliation of the former subscriber further comprises determining a confidence value based on correlation results determined from correlating said in-network and out-of-network calling behaviors, said confidence value indicating a confidence at which the external network subscriber has been identified as being the former subscriber.

7. The method of claim 1, further comprising accumulating the first CDRs based on identifying a subset of current subscribers that are considered likely to leave the first network operator, said subset of current subscribers including the former subscriber at a time before the former subscriber departed, and accumulating CDRs at least for said subset of subscribers.

8. The method of claim 7, further comprising determining in-network social connections for the former subscriber using said first CDRs and identifying in-network calling behaviors for the former subscriber with respect to those in-network social connections, which are other subscribers of the first network operator.

9. The method of claim 8, further comprising accumulating the second CDRs by collecting CDRs at least for the in-network social connections of the former subscriber, and identifying out-of-network calling behaviors for one or more of those in-network social connections.

10. The method of claim 1, further comprising filtering the first and second CDRs in advance of determining the in-network and out-of-network calling behaviors, respectively, such that said first and second CDRs each comprise per call data records including one or more of: calling number, called number, served MSISDN, call duration, call volume, number of events, timestamp and a location data.

11. The method of claim 1, wherein determining the in-network calling behavior comprises determining most frequently called/calling numbers and characteristic call times and durations for in-network calls involving the former subscriber during the first data collection window, and wherein determining the out-of-network calling behavior comprises determining most frequently called/calling numbers and characteristic call times and durations for out-of-network calls involving said one or more remaining subscribers during the second data collection window.

12. A processing apparatus configured to identify new network affiliations of former subscribers that have left a first network operator, said processing apparatus comprising:
a pattern recognition processor configured to:
determine in-network calling behavior for a former subscriber of the first network operator, based on evaluating first call data records (CDRs) accumulated for a first data collection window occurring at least partly before the former subscriber left the first network operator; and
determine out-of-network calling behavior for one or more remaining subscribers that are identified from the in-network calling behavior of the former subscriber, based on evaluating second CDRs accumulated for a second data collection window occurring at least partly after the former subscriber left the first network operator;
a correlation processor configured to correlate the in-network calling behavior with the out-of-network calling behavior, to identify an external network subscriber that is involved in out-of-network calls with said one or more remaining subscribers that characteristically match prior in-network calls between said one or more remaining subscribers and the former subscriber; and
an identification processor configured to identify the new network affiliation of the former subscriber according to the external network number associated with the identified external network subscriber.

13. The processing apparatus of claim 12, wherein the pattern recognition processor is configured to determine the in-network calling behavior by identifying first call patterns in the first CDRs, said first call patterns reflecting one or more call characteristics for in-network calls involving the former subscriber during the first data collection window, and is further configured to determine the out-of-network calling behavior by identifying second call patterns in the second CDRs, said second call patterns reflecting one or more call characteristics for out-of-network calls involving said one or more remaining subscribers during the second data collection window.

14. The processing apparatus of claim 13, wherein the correlation processor is configured to correlate the in-network calling behavior with the out-of-network calling behavior by correlating values representing the one or more call characteristics for the in-network calls with respective values representing the one or more call characteristics for the out-of-network calls.

15. The processing apparatus of claim 12, wherein the correlation processor is configured to correlate the in-network calling behavior with the out-of-network calling behavior by determining whether there are out-of-network calls between an external network subscriber and the one or more remaining subscribers during second data collection windows that characteristically match in-network calls between the former subscriber and the same one or more remaining subscribers during the first data collection window and, if so, identifying that external network subscriber as the former subscriber.

16. The processing apparatus of claim 12, wherein, for the case where correlation of the in-network and out-of-network calling behaviors identifies more than one external network subscriber as possibly being the former subscriber, said correlation processor is further configured to compare the degree of correlation exhibited for each of the more than one external subscribers, or to perform further correlations involving additional call characterization parameters, to identify the one external network subscriber that is most likely to be the former subscriber.

17. The processing apparatus of claim 12, wherein the identification processor is configured to determine a confidence value based on correlation results determined from correlating said in-network and out-of-network calling behaviors, said confidence value indicating a confidence at which the external network subscriber has been identified as being the former subscriber.

18. The processing apparatus of claim 12, wherein the first CDRs are accumulated by or for the processing apparatus based on identifying a subset of current subscribers that are considered likely to leave the first network operator, said subset of current subscribers including the former subscriber at a time before the former subscriber departed, and accumulating CDRs at least for said subset of subscribers.

19. The processing apparatus of claim 12, wherein the processing apparatus is configured to determine in-network social connections for the former subscriber using said first CDRs and identify the in-network calling behaviors for the former subscriber with respect to those in-network social connections, which are other subscribers of the first network operator.

20. The processing apparatus of claim 19, wherein the second CDRs are accumulated by or for the processing apparatus based on collecting CDRs at least for the in-network social connections of the former subscriber, and wherein the processing apparatus is configured to identify the out-of-network calling behaviors for one or more of those in-network social connections.

21. The processing apparatus of claim 12, wherein the processing apparatus is configured to filter the first and second CDRs in advance of determining the in-network and out-of-network calling behaviors, respectively, such that said first and second CDRs each comprise per call data records including one or more of: calling number, called number, served MSISDN, call duration, call volume, number of events, timestamp and a location data.

22. The processing apparatus of claim 12, wherein the processing apparatus is configured to determine the in-network calling behavior by determining most frequently called/calling numbers and characteristic call times and durations for in-network calls involving the former subscriber during the first data collection window, and to determine the out-of-network calling behavior by determining most frequently called/calling numbers and characteristic call times and durations for out-of-network calls involving said one or more remaining subscribers during the second data collection window.

* * * * *